Nov. 20, 1962  G. VIGANO'  3,064,530
ARRANGEMENT FOR ADJUSTING THE SLOPE OF SPECTACLE
RIMS WITH REFERENCE TO THE SIDES
Filed April 7, 1959
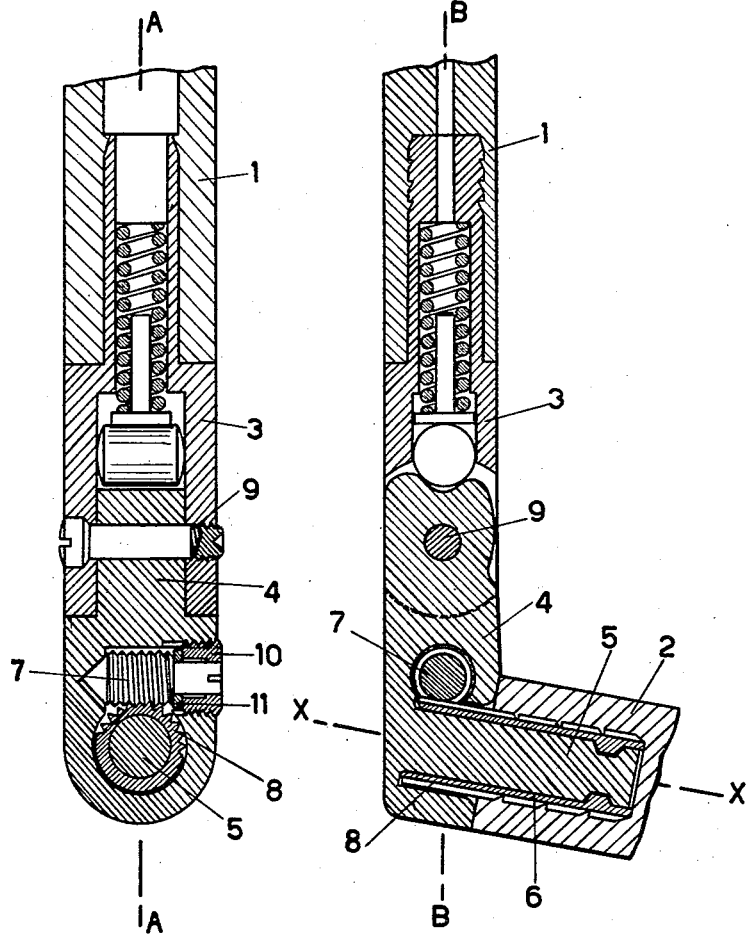
INVENTOR
Gianni Viganò
BY Michael S. Striker
ATTORNEY

United States Patent Office 3,064,530
Patented Nov. 20, 1962

3,064,530
ARRANGEMENT FOR ADJUSTING THE SLOPE OF SPECTACLE RIMS WITH REFERENCE TO THE SIDES
Gianni Viganó, Milan, Italy, assignor to La Meccanoptica S.p.A., Milan, Italy, an Italian company
Filed Apr. 7, 1959, Ser. No. 804,808
Claims priority, application Italy Apr. 30, 1958
3 Claims. (Cl. 88—53)

The present invention has for its object an arrangement which allows adjusting the slope of the body of spectacle rims with reference to the sides with a view to ensuring an improved angular setting of the lenses with reference to the wearer's eyes, this condition being extremely important, chiefly in the case of lenses having two or three foci.

This improved arrangement is characterized by the fact that the elements forming the hinges connecting the two sides with the body of the rims are adapted to rock round an axis which lies substantially in the plane of the body of the rims while the connection which allows a relative angular shifting between the body of the rims and the associated hinge element includes a worm and worm-wheel system or the like.

In contradistinction with most of the arrangements which have been proposed hitherto, the improved arrangement disclosed shows the advantage of providing a relative angular shifting of the sides with reference to the body of the spectacle rims through the mere operation of a worm with the use of a non reversible mechanical gear ensuring thereby perfect stability of the connection between the sides and the body of the rims once the adjustment of the slope of said body has been obtained.

In order to make the invention more readily understood, reference will now be made to the accompanying drawings given by way of example and wherein:

FIG. 1 illustrates a partial cross-section through line A—A of FIG. 2 of a section of spectacle rims extending through the connection between one side and the body of the rims.

FIG. 2 is a partial cross-section passing through line B—B of FIG. 1.

In the case illustrated, one of the temples or sides 1 is shown as connected with the body 2 of the lens rims through a hinge including the two elements 3 and 4 revolubly carried by a common pivot 9 in a manner such that it is possible to give the side 1 the desired inclination with reference to the body 2 in the conventional manner. The element 4 of the hinge instead of being secured permanently to the body of the rims is angularly shiftable with reference to the latter round the axis X—X extending substantially in the plane of the rim body. This arrangement is obtained by providing the said element 4 with a pivot 5 extending laterally and revolubly carried in a sleeve 6 fitted in the corresponding end of the body 2. The two movable members 5 and 6 are operatively interconnected by the worm 7 adapted to rock round its axis inside the housing provided for it inside the hinge element 4, said worm meshing with a peripheral toothed section of the tubular worm wheell 8 formed on the end of the sleeve 6 projecting out of the end of the rim body. In the case illustrated, the sleeve 6 is secured to the rim body through a toothed and ribbed shank urged with a force fit inside an opening provided inside the material forming said body.

When the worm is caused to rock round its axis, this produces a rotation of the sleeve round its axis and thereby of the rim body round the axis X—X. It is theoretically possible to obtain thereby a complete revolution through 360°, but in practice, the operative range of shifting may be limited to 10 to 20° at the maximum and in practice, it may extend between about 0 and 12°.

By reason of the speed reduction between the worm and the worm-wheel, it is possible to obtain the desired adjustment through one or two turns of the screw at a maximum.

The system disclosed is obviously non reversible and consequently it is not possible to obtain a relative rotation between the parts through action on the hinge element carried by the rim body and it can be obtained only through a suitable operation of the worm.

In order to cut out any clearance between the worm and the worm-wheel, the screw is provided with a conical tip. The screw is housed inside the hinge element 4 inside a recess terminating with a conical seat for the tip of the worm, the axis of said conical seat for the tip of the worm, being slightly shifted in parallelism with the axis of the worm towards the worm-wheel. The worm 7 is held in place by the concentric washer 11 and fixed nut 10, the latter shown in the drawings as threaded to element 4 at the mouth of the recess therein. When screwing down the washer and worm, the latter has a tendency to progress and also to be shifted towards the worm-wheel as far as the clearance may allow.

The clearance may also be cut out by resorting to an elastic washer between the washer holding the screw and the cooperating abutment for the screw.

Obviously, the worm may have one or more threads with teeth of a suitable outline. The toothed sector may extend over an arc as large as may be desired. The shape of the shank locking the sleeve inside the material of the rim body may be given any desired shape without thereby unduly widening the scope of the invention defined in the accompanying claims.

What I claim is:

1. In a spectacle frame, structure for adjusting the inclination of the lens rim with respect to a temple about an axis, said structure comprising, in combination, a tubular sleeve anchored coaxially with said axis in a blind bore formed in said rim, said sleeve projecting from said bore and comprising a periphery at least a portion of which is formed with axially parallel teeth whereby said sleeve constitutes a worm wheel; a pivot member rigidly connected with said temple and rotatably anchored in said sleeve whereby the sleeve and the rim are rotatable about said pivot member with respect to said temple; and a worm mounted in said temple for rotation about an axis perpendicular to said first mentioned axis and meshing with the teeth of said sleeve, a rotation of said worm causing the sleeve to rotate about said pivot member to change the angular position of said rim with respect to said temple.

2. In a spectacle frame, structure for adjusting the inclination of the lens rim means with respect to a temple means about an axis, said structure comprising, in combination, a tubular worm wheel rigidly secured to one of said means coaxially with said axis; a pivot member coaxially received in and rotatably supporting said worm wheel, said pivot member rigid with the other of said means; and a worm rotatably mounted and retained in said other means and meshing with said worm wheel, a rotation of said worm causing the worm wheel to rotate and to angularly displace said one means about said pivot member.

3. The spectacle frame according to claim 2 wherein said worm wheel is secured to said lens rim means and projects therefrom, and said pivot member and worm are respectively secured to and mounted in said temple means.

References Cited in the file of this patent
UNITED STATES PATENTS

| | | |
|---|---|---|
| 1,811,349 | Clement | June 23, 1931 |
| 2,386,012 | Street | Oct. 2, 1945 |
| 2,668,291 | Schauweker | Feb. 9, 1954 |
| 2,874,609 | Ducati | Feb. 24, 1959 |